United States Patent
Hanley

(10) Patent No.: US 7,306,463 B2
(45) Date of Patent: Dec. 11, 2007

(54) PSEUDO-CUNEIFORM TACTILE DISPLAY

(76) Inventor: Brian Paul Hanley, 376 Via Hidalgo, Greenbrae, CA (US) 94904

(*) Notice: Subject to any disclaimer, the term of this patent is extended or adjusted under 35 U.S.C. 154(b) by 0 days.

(21) Appl. No.: 10/894,991

(22) Filed: Jul. 19, 2004

(65) Prior Publication Data

US 2006/0014123 A1    Jan. 19, 2006

(51) Int. Cl.
*G09B 21/00* (2006.01)

(52) U.S. Cl. .................... 434/113; 434/114; 340/407.1; 340/407.2; 345/31; 400/109.1

(58) Field of Classification Search ........ 434/112–117; 340/407.1, 407.2; 345/31, 168, 184; 400/109, 400/109.1
See application file for complete search history.

(56) References Cited

U.S. PATENT DOCUMENTS

| | | | |
|---|---|---|---|
| 2,891,324 A | 6/1959 | Zuk | |
| 3,363,339 A * | 1/1968 | Place | .......................... 434/113 |
| 3,395,247 A | 7/1968 | Fieldgate | |
| 3,510,967 A | 5/1970 | King et al. | |
| 3,592,965 A | 7/1971 | Dies | |
| 3,987,438 A | 10/1976 | Lindenmueller et al. | |
| 4,033,053 A | 7/1977 | Engler | |
| 4,044,350 A | 8/1977 | Tretiakoff et al. | |
| 4,178,586 A | 12/1979 | Schonherr | |
| 4,191,945 A | 3/1980 | Hannon et al. | |
| 4,194,190 A | 3/1980 | Bareau | |
| 4,215,490 A | 8/1980 | Fewell | |
| 4,266,936 A | 5/1981 | Rose et al. | |
| 4,445,871 A | 5/1984 | Becker | |
| 4,473,356 A | 9/1984 | Fernando et al. | |
| 4,500,293 A | 2/1985 | Eltgen | |
| 4,586,903 A | 5/1986 | Burchart | |
| 4,586,904 A | 5/1986 | Chlumsky | |
| 4,871,992 A | 10/1989 | Petersen | |
| 5,086,287 A | 2/1992 | Nutzel | |
| 5,453,012 A | 9/1995 | Hudecek | |
| 5,466,154 A | 11/1995 | Thompson | |
| 5,474,295 A * | 12/1995 | Demshuk | ................. 273/141 A |
| 5,546,784 A | 8/1996 | Haas et al. | |
| 5,583,478 A | 12/1996 | Renzi | |

(Continued)

FOREIGN PATENT DOCUMENTS

GB        2153576 A  *   8/1985

OTHER PUBLICATIONS

Brian Hanley, "Information Disclosure Guide for Examiner for Patent Application of Brian P. Hanley U.S. Appl. No. 10/894,991", guide for examiner, Aug. 2004, pp. 1-8, Published by: Brian Hanley, Greenbrae, CA, USA.

(Continued)

*Primary Examiner*—Dmitry Suhol
(74) *Attorney, Agent, or Firm*—Temmerman Law Office; Matthew J. Temmerman

(57) ABSTRACT

This is an entirely new type of tactile display based upon cuneiform writing concepts which is an alternative to Braille. This invention uses electromechanical components to display a tactile coding of letters, numbers and symbols using rotating linear components and pointer variations of these. These pointer parts rotate on the surface of the device. A user places fingers or skin on the surface and by feeling the direction in which the components are pointing determines the coded symbol.

20 Claims, 4 Drawing Sheets

U.S. PATENT DOCUMENTS

Figure 1:
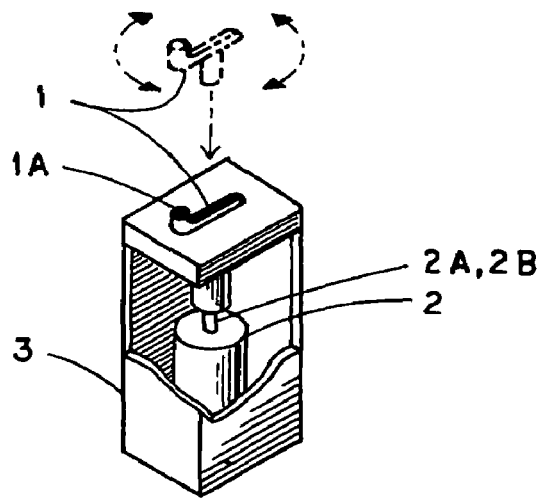

| | | | |
|---|---|---|---|
| 5,717,423 | A | 2/1998 | Parker |
| 5,766,014 | A | 6/1998 | Ida et al. |
| 5,772,440 | A | 6/1998 | Ida |
| 5,775,252 | A * | 7/1998 | Kilgore ............ 116/205 |
| 6,012,314 | A | 1/2000 | Sullivan et al. |
| 6,209,380 | B1 | 4/2001 | Papazian et al. |
| 6,445,284 | B1 * | 9/2002 | Cruz-Hernandez et al. ............ 340/407.1 |
| 6,459,364 | B2 * | 10/2002 | Gupta ............ 340/407.1 |
| 6,462,840 | B1 | 10/2002 | Kravtsov |
| 6,734,785 | B2 | 5/2004 | Petersen |

OTHER PUBLICATIONS (Author Unknown), "Short History of Reading Codes for the Blind Other than Braille", excerpted from http://www.nyise.org/blind/hauy.htm, http://www.nyise.org/blind/gall.htm, May 6, 1996, pp. 1-3, published by: The New York Institute for Special Education, New York, New York, USA.

Simon Ager, "Moon Alphabet", excerpted from http://www.omniglot.com/writing/moon.htm, 1998, pp. 1-2, published by: Omniglot Guide to Writing Systems, Brighton, East Sussex, Great Britian.

S. B. Fishburne, "Fishburne Alphabet", copy of original thermoformed sheet from vendor, 2000, single page, published by: Fishburne Enterprises, Hemet, CA, USA.

(Author Unknown), "A Tribute to Volunteers", copy of article from unknown journal (supplied by Fishburne Enterprises), circa 1985.

M.R. Shafrath, "An Alternative to Braille Labeling", Visual Impairment and Blindness, Nov. 1986, p. 955 and 956, published by: American Foundation for the Blind, NY, NY, USA.

Simon Ager, "Braille", excerpted from http://www.omniglot.com/writing/braille.htm, 1998, pp. 1-4, published by: Omniglot Guide to Writing Systems, Brighton, East Sussex, Great Britian.

Lawrence K Lo, "Linear A and Linear B", excerpted from http://www.ancientscripts.com/lineara.html and http://www.ancientscripts.com/linearb.html, circa 2000, pp. 1-4, published by: Ancient Scripts, Foster City, CA, USA.

Richard Hooker, "Cuneiform" excerpted from http://www.wsu.edu:8080/~dee/GLOSSARY/CUNEI.HTM, 1996, pp. 1-2, published by: Washington State University and Richard Hooker, Pullman, Washington, USA.

(Cuneiform authors last in antiquity) "Cuneiform Artifacts" excerpted from: http://special.lib.umn.edu/rare/cuneiform/, 2004, pp. 1-3, published by: Special Collections/Rare Books, 111 Elmer L. Andersen Library, University of Minnesota, Minneapolis, MN, USA.

(author()s unknown) "Chording Keyboards" excerpted from http://www.tifaq.com/keyboards/chording-keyboards.html, 1998-2002, pp. 1-5, published by: CTD Resource Network, Inc. , Los Banos, CA, USA.

* cited by examiner

PSEUDO-CUNEIFORM TACTILE DISPLAY

CROSS REFERENCE TO RELATED APPLICATIONS

| | | |
|---|---|---|
| 2891324 | June 1959 | Zuk |
| 3395247 | July 1968 | Fieldgate |
| 3510967 | May 1970 | King et al. |
| 3592965 | July 1971 | Dies |
| 3987438 | October 1976 | Lindenmueller et al. |
| 4033053 | July 1977 | Engler |
| 4044350 | August 1977 | Tretiakoff et al. |
| 4178586 | December 1979 | Schonherr |
| 4191945 | March 1980 | Hannon et al. |
| 4194190 | March 1980 | Bareau |
| 4215490 | August 1980 | Fewell |
| 4266936 | May 1981 | Rose et al. |
| 4445871 | May 1984 | Becker |
| 4473356 | September 1984 | Fernando et al. |
| 4500293 | February 1985 | Eltgen |
| 4586903 | May 1986 | Burchart |
| 4586904 | May 1986 | Chlumsky |
| 4871992 | October 1989 | Petersen |
| 5086287 | February 1992 | Nutzel |
| 5453012 | September 1995 | Hudecek |
| 5466154 | November 1995 | Thompson |
| 5546784 | August 1996 | Haas et al. |
| 5583478 | December 1996 | Renzi |
| 5717423 | February 1998 | Parker |
| 5736978 | April 1998 | Hasser et al. |
| 5766014 | June 1998 | Ida et al. |
| 5772440 | June 1998 | Ida |
| 6012314 | January 2000 | Sullivan et al. |
| 6209380 | April 2001 | Papazian et al. |
| 6462840 | October 2002 | Kravtsov |
| 6734785 | May 2004 | Petersen |

A number of patents intended for three dimensional or tactile displays are listed above. These patents contain pin, rod and other vertically moving elements for producing tactile display. The current patent improves on this prior art by using rotational and horizontal movement of otherwise fixed elements. This patent improves on these patents by making a simpler system of rotating and horizontally sliding tactile elements of modules which do not primarily travel in the Y axis perpendicular to the display surface but primarily in the X-Z plane of the surface.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF INVENTION

1. Field of Invention

This invention relates to the application of electromechanical techniques to tactile display, with sets of directionally pointing elements moving in the X-Z plane for use by people in tactile reading of symbols, characters and numbers, by rotating the tactile pointer elements.

2. Prior Art

The genesis of this invention came with the observation of a problem that blind people have. The vast majority of the blind or seriously visually impaired cannot read Braille. There are approximately 10 million people in the USA today classified as blind or visually impaired. Braille readers may total as many as a hundred thousand, but most estimates put the Braille reading population at 45,000 to 50,000 people in the USA. That total is between 0.5% and 1% of the 10 million blind and visually impaired, and it is 4% to 8% of the roughly 1.5 million legally blind who reside in the USA, depending on which figure is used. This is very poor coverage of the need. Even among those who cannot read with some visual aid, or can do so with extreme difficulty, the percentage of those that use Braille remains extremely low. When looking at employment figures compiled by organizations for the blind, this problem stands out even more, since most blind people who read Braille are employed, and very few who do not read Braille are employed. The ability to read seems to be crucial to employment for blind people.

There are good reasons why so few people read Braille. Primary among them is the difficulty of learning it. A person with normal tactile sensitivity can learn Braille with intense study over months. Their proficiency grows over years. However, for those who do not learn it when young, it is rare for the person to ever become proficient enough to read it quickly for long periods of time. For those with less than normal tactile sensitivity, it is simply impossible to learn Braille. Virtually all of those whose blindness is a result of diabetes are physically incapable of learning Braille.

The problem which emerges when looking at these issues is: How can one make a tactile system which is useable by the majority of the blind or visually impaired for whom Braille is impractical or impossible? This rotating pointer tactile display fulfills that need.

There are alternative tactile codes to Braille. The two most common are Moon code, invented in 1845, which is still supported by the RNIB of England, having books in 471 languages based on the Moon roman alphabet, and Fishburne code, invented in 1975 and protected by copyright, currently supported by the inventor's son. Both of these codes have proven much easier to learn to read than Braille, and are in common use, primarily by those who become blind later in life. Moon code in particular has withstood the test of time. A sighted person can easily see why Moon code has remained, since it is possible to figure out many words by looking at the raised characters. This makes it easy for those who learned the Roman alphabet when they were young to read it, and minimizes the problems associated with sighted teachers, since anyone who can read English can learn to read Moon by sight in a few days. Fishburne looks quite promising for posterity as well, due to its vastly superior ease of tactile discrimination over both Braille and Moon, although, to date, Fishburne has mainly been used for simple tasks like labeling.

There are other embossed tactile codes produced by intelligent people who have helped their friends and relatives, unaware that the problem has been solved before. For example, there is such a code from India, which is hammered out with small blocks, that is quite suitable for persons who are poverty stricken. However, all of these alternative codes have a serious problem in the electronic age. They may be as easy to emboss as Braille is by a large printing press style of machine, a specialized label-maker, or a hand held stylus, but they are impractical to adapt for use with computers in a personal tactile display due to the complexity of the symbols. Thus, to date, Braille remains the only viable tactile display code which can be adapted to electronic display.

In addition, the technology for producing Braille electronic displays is quite expensive. A typical price today for an 80 character display for Braille is $10,000. A good quality 40 character display will cost more than $4,000 today, and prices are not going down. The current invention uses older, simpler, components to achieve a less expensive display.

This invention solves the problems described above, using a new method which can be adapted to encoding characters that has most of the strengths of Fishburne and Moon in terms of learning and tactile definition, yet is cheaper to manufacture than current Braille tactile displays. I developed this by thinking backwards from what would be the least expensive components for a tactile display, and then I looked at how one could adapt these to a code that has the virtues of Moon and Fishburne. For a time, I attempted to develop a design that would display Fishburne code precisely, but realized that this was probably futile. Key to the invention is that a space character can be represented by a specific tactile symbol which is not smooth. Like the symbol for zero in mathematics, tactile coding for this device requires allocation of a symbol to represent a blank space. Significant sources of inspiration for this invention were the ancient written languages of Linear A and B. More important than these, however, were the cuneiform scripts which evolved from the older pictographic forms to an abstract system based on wedge shapes. Cuneiform writing developed roughly 3100 BC; however the roots of this form of writing extend back to the $9^{th}$ millennium BC, roughly 11,000 years ago. I noted many years ago that cuneiform scripts are readable by feel alone, and had observed some years ago, in passing, that with cuneiform script in particular, blind scribes would have been quite practical.

This patent uses linear pointed elements or wedge shapes that draw in general concept on cuneiform writing, with the linear pointed elements collated into symbols which improves upon prior art in several ways. In this patent, symbols are greatly regularized and simplified compared to cuneiform script. Linear and cuneiform scripts are incised or impressed into clay. In this patent, the primary embodiment of the tactile elements are present in raised relief above the panel instead of impressed into the panel, although an impressed embodiment could occur. This patent uses movable elements to allow an electronic device to change what is written, instead of wet clay which is allowed to harden; by making the pointing elements movable this patent improves upon this ancient prior art again.

Figure 5:
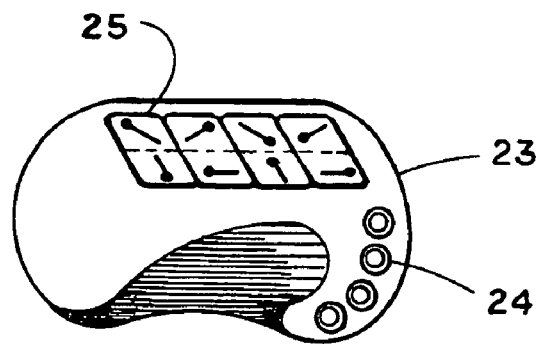

The hand held reading device of FIG. 5 also harks back to ancient times in some respects. There are conical clay tablets with cuneiform writing on their surface, which are of a size convenient to hold in one hand. I have noted for some years that such conical clay tablets are very convenient for reading by feel while held in one hand. This would have left the eyes of warehouse, tax or customs personnel of the time free to look at what is around them while reading. However, as noted above, this form of script is impressed into the surface and is also immobile, whereas, the current invention has moveable elements that in their primary embodiment are raised, although they could also be impressed as with Cuneiform, together with a new symbol system different from Cuneiform alphabets. This hand held device in its primary embodiment also allows the tactile characters to be present on keys which can be pressed.

This invention is an integration of existing components and art in a new way, combined with specially shaped tactile elements which allow the blind person to feel the symbol they represent. Accordingly, there these unique, rotational, pointers and other aspects of this invention are novel and not obvious within the field of tactile displays.

OBJECTS AND ADVANTAGES

The overall object of the invention is to provide a means for allowing those who are blind to read, and by extension, to write by means of a keyboard, which enables them to enter society in a more productive way. The invention is an electromechanical panel which positions character representation elements so that they can be read by tactile means alone. The overall advantages are primarily—provision of a means of reading that is much easier to learn than Braille, and that requires less tactile sensitivity. The device is also flexible and reconfigurable so that it can represent different alphabets as well as specialized mathematical symbols. The script which is represented is also relatively easy for a sighted person to learn to read, which is not true for Braille.

Summary Advantages:
  (a) To provide a system using modules containing rotating elements which are grouped in sets, typically of 2 and 4, to encode meaningful symbols in a tactile manner.
  (b) To provide a set of tactile codes that can be produced at different sizes without significantly changing recognizability, to allow users to read who have widely varying tactile sensitivity.
  (c) To connect this device to a computer or other electronic signaling device that will send signals for letters and symbols to display.
  (d) To make possible a less expensive tactile display for use with computers and other electronic media.
  (e) To make possible a tactile display which is practical for sighted readers to learn.
  (f) To make possible a tactile display that can be potentially used as a keyboard.
  (g) To make possible a tactile display that can potentially be used to create a new type of cell phone and/or PDA device.

SUMMARY OF THE INVENTION

In accordance with the preferred embodiment of the invention, a container with a top panel, that contains electronics and small motors or other actuators which make it possible for the tactile code elements to rotate or slide in a controlled manner to positions that are read by the sense of touch as text, numbers, and other special symbols making up language and mathematics or other grammar. The panel contains electronics, mechanical hardware, software and algorithms that combine to convert binary coded character sets into tactile output. Depending on the method of engineering the device, it may use different mechanical technologies. For example, the panel may use pneumatic actuators controlled by a set of valves to position the elements instead of small electrical motors and/or electromagnet assemblies.

DRAWINGS

Figures

FIG. 1—Schematic cutaway view of one tactile element module.

Figure 2:
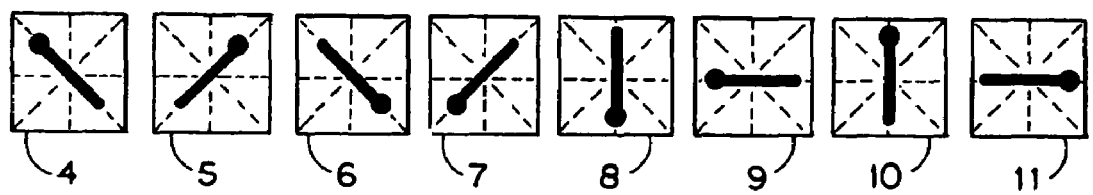

FIG. 2—Schematic of 8 of the most common positions that one tactile element module can take.

Figure 3:
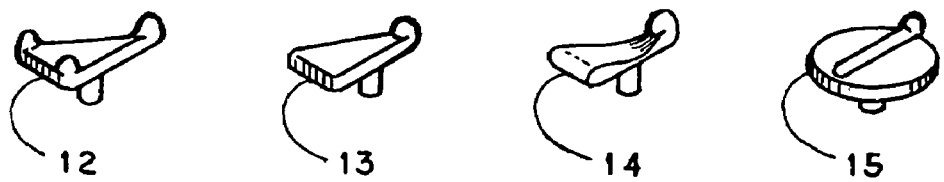

FIG. 3—Schematic of alternative shapes which a module tactile element may take.

Figure 4:
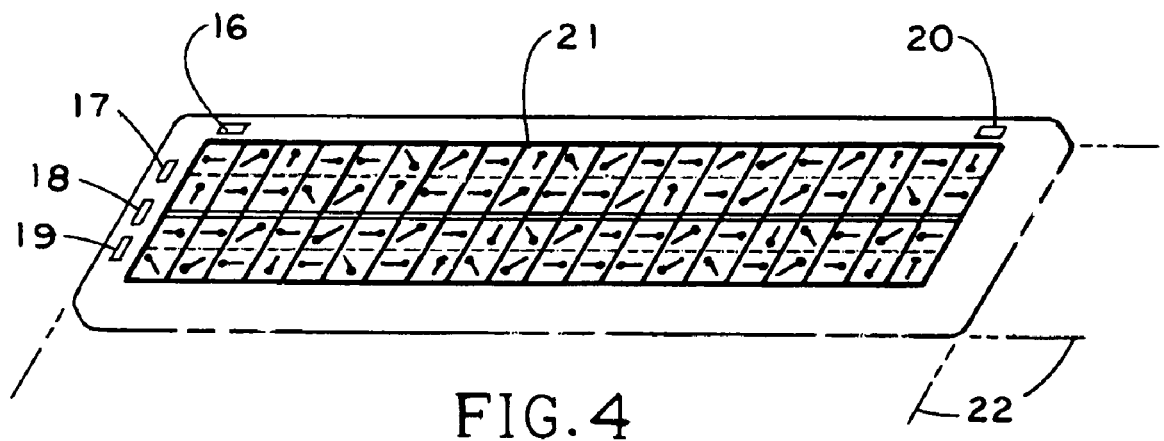

FIG. 4—Schematic of a display device, assembled, consisting of 2 rows of 20 vertically paired tactile element modules.

FIG. 5—Orthogonal view of a hand held chord keying display device.

Figure 6:
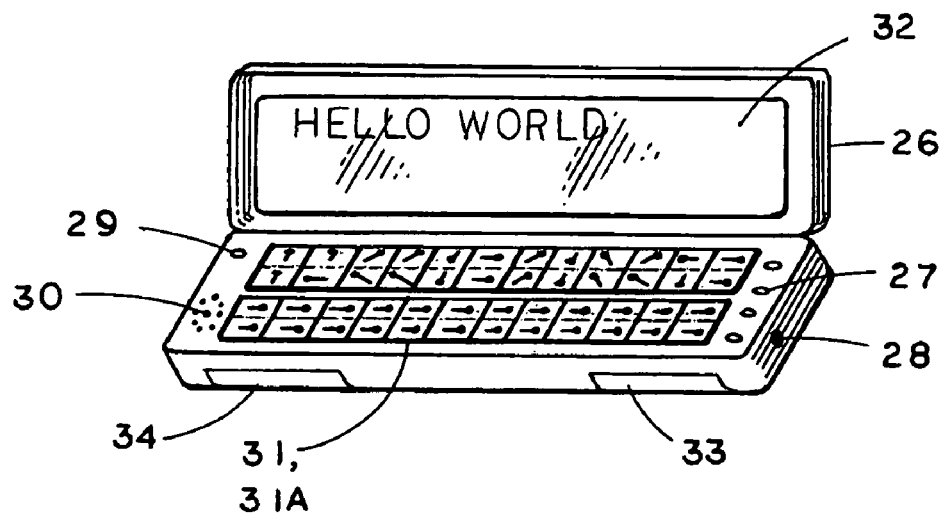

FIG. 6—Schematic of a fully assembled standalone display with all features.

Figure 7:
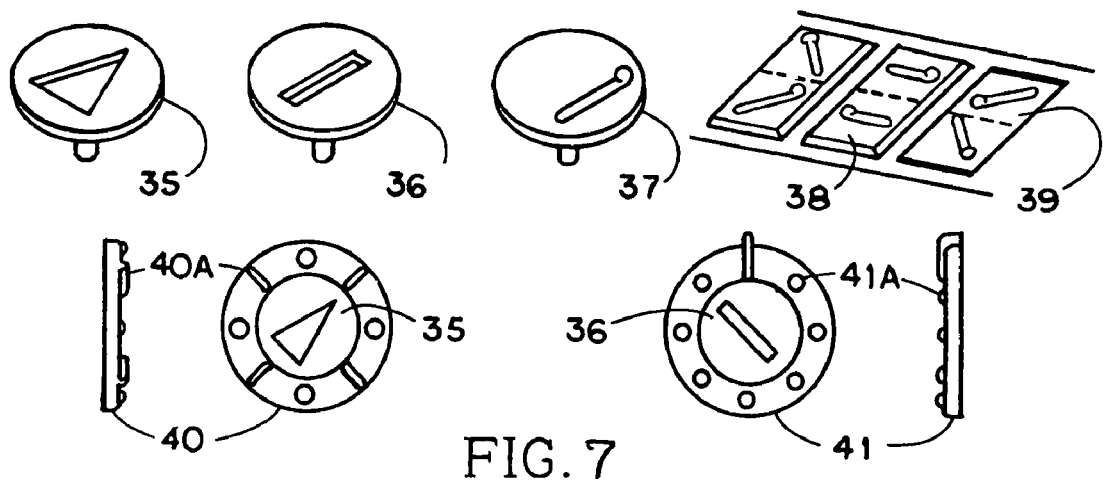

FIG. 7—Orthogonal and schematic views of pointing elements

Figure 8:
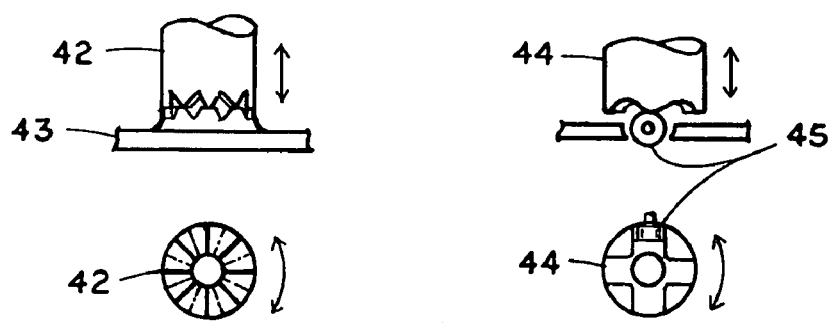

FIG. 8—Schematic views of cam arrangements for raising and lowering

Figure 9:
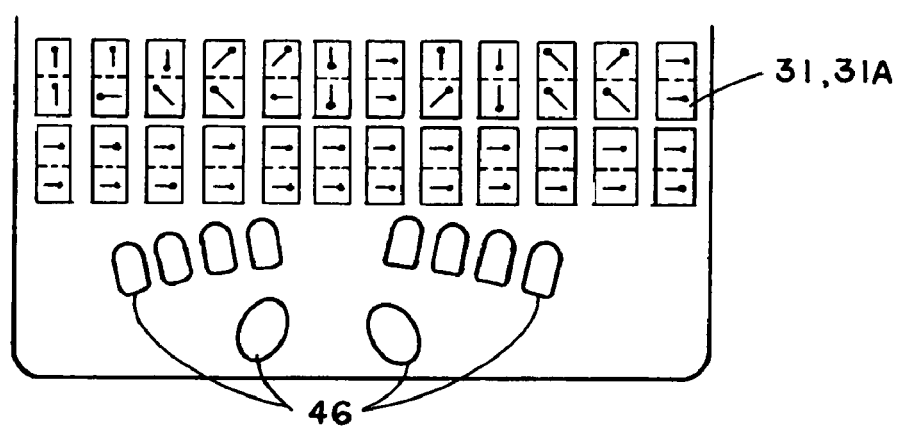

FIG. 9—Schematic view of alternative keyboard.

Figure 10:
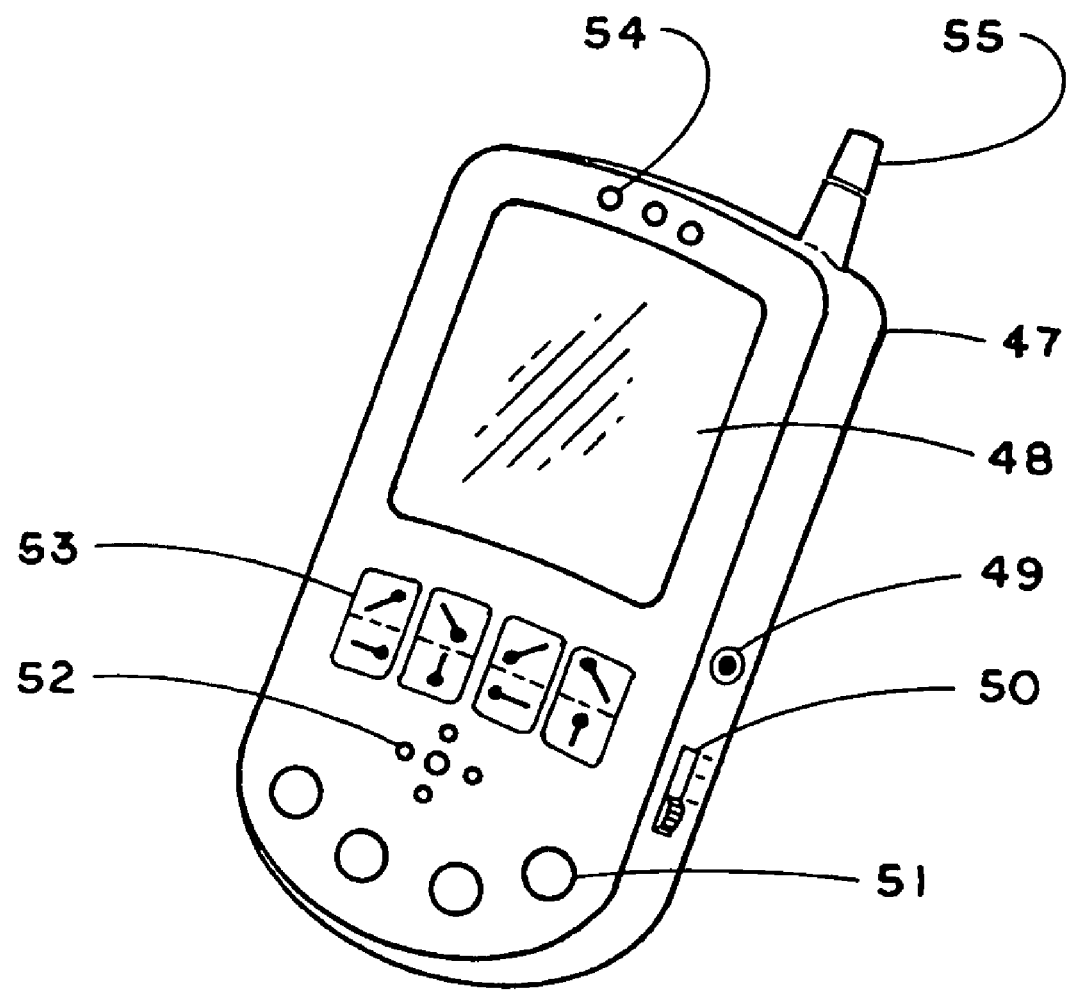

FIG. 10—Integrated device orthogonal view

DETAILED DESCRIPTION

FIGS. 1, 2, 4, 6

Preferred Embodiment

The device contains modules, FIG. 1 composed of a rotating motor 2, which steps the rotatable tactile element 1 circularly, like the hand of a clock, in either clockwise or counter-clockwise manner, usually be means of a shaft, 2A. In this schematic, the tactile element is a simple rod shape with a nub on one end, 1A to indicate direction.

The device has tactile elements, FIG. 2 which are clearly directional from one end to the other. In this diagram is shown how the tactile element can take multiple rotational positions. Most commonly, each element would only take 8 possible positions out of the circle of angular possibilities, with directionality shown by the round nub on one end, 4-11.

The device panel, FIG. 4, shows two rows of 20 vertically paired tactile display elements 21. This panel could be made as large as desired, 22. The panel would usually incorporate buttons or some equivalent control for scrolling content left and right, 16 and 20, as well as up and down, 17 and 19. A kind of cursor, mouse click could be provided by means of a button or touch sensitive area 18.

FIGS. 3, 5 and 6

Alternative Embodiments

The invention can have alternative embodiments. The fundamental configuration could have variation in the precise shape of the tactile elements shown in these diagrams so as to improve tactile usability FIG. 3, 12-15. The tactile elements of the device, FIG. 3, can vary in shape, as long as they are clearly directional from one end to the other. In this diagram, the shape is an acute isosceles triangle as seen in the isometric view, 12, 13, 14, which has a clear direction. The tactile element has nubs of different size on each of its three acute angles, 12, to further clarify the tactile sensation. This diagram also shows a simple triangular pointer 13, with a nub at the acute angle, and a form with a mild domed rise along the short side 14, which, together with the knurled nub at the acute angle, further clarifies the direction it is pointing.

The device may have pointing elements FIG. 7 which are recessed instead of raised, 35, 36. The tactile element may be mounted somewhat off-center to further improve the tactile differentiation of each position, 37. The characters may be set on raised, 38, or recessed, 39, areas of the panel instead of being mounted on areas which are flush with the surface, FIG. 4, 21, as in the primary embodiment.

The device may be shaped to fit ergonomically into a person's hand, FIG. 5, 23, presenting the tactile display elements on the surface of keys 25, which can also be pressed to use as input devices. The device may allow data entry through pressing of chords using tactile display keys 25 and/or simple keys, 24.

The device may come together with an LCD FIG. 6, 32 or other type of standard visual display and a hinged lid, 26, which may be a detachable option. The device may incorporate a speaker 30, or audio output jack 28, which may be used to provide a secondary audio channel together with the tactile display. This audio channel could be used, for example, as part of a training system. The device could have buttons, 27 for controlling scrolling of text. Audio on/off/volume control 29 would normally be provided.

The display panel, FIG. 6, may be composed of display elements, all or some of which are placed on press-able keys, or equivalent touch sensitive surface. This can allow the manufacture of a device which is both a display and a keyboard. Most commonly, since this is a device for the blind, the panel would contain a subset of display elements which were chord keys 31. The device could also have keys which are arranged separately from the display area FIG. 9, 46. Since chord keys do not require the user to move their fingers, they are often easier for a blind person to locate and type with.

Also alternatively, the surface of the panel could be made up of some type of transparent or visible touch sensitive material FIG. 6 and FIG. 9, to allow the system to automatically track the progress of the reader's skin across its surface, 31A.

In an alternative embodiment, pointer elements could raise and lower to some degree, FIG. 8, up and down as they rotate, by means of a cam arrangement, to improve tactile readability. In one possible embodiment of the cam, the upper cam 42 slides so that it rises up and down as the pointing elements turn because of the teeth on the lower cam, 43. Similarly, in a different cam system, the upper cam, 44, raises up and down as it turns across crossed rollers 44.

In an alternative embodiment, some or all pointing elements FIG. 1 could have a vibrator 2B to enhance tactile sensation.

There could be a set of raised nubs or lines FIG. 7 surrounding the pointing element to make it easier in the beginning to differentiate what direction the display element 35, 36 is pointing. The roughly circular arrangement could consist entirely of nubs, entirely of lines, or some combination. A tactile nub is shown in 41A; a tactile line is shown in 40A. These could be arranged on the surface of the panel, or on a ring, 40 and 41.

The invention could also have an embodiment FIG. 10 which integrated a cell phone, PDA, radio or some computing device in a case 47, which may incorporate: an antenna 55, sound/data/voice jack 49, volume control 50, tactile display 63, LCD panel 48, control buttons 51, microphone 52, speaker 54.

Operation

Operation of the device will be simple from a user's viewpoint. The user will move an area of skin, typically hand and fingers, over the surface, deciphering each group of pointers to represent a symbol. The user will press a button, turn a wheel, or rest their fingers on some touch sensitive surface to signal for the next set of symbols to be displayed. The device will rotate each module accordingly to a position so as to represent the new symbols.

Description and Operation of Alternative Embodiments

The user of the device may listen to a speaker or through headphones as he reads, listening to each character as he reads it with his fingers. Alternatively, the user could listen to the device speak each word as he begins or completes reading it. This would normally be a training mode.

The user may make use of keys on the keyboard which are also displaying tactile symbols, to enter data. The user may make use of separate keys or controls on the keyboard to enter data which are single use, embedded into the display. These keys may operate like a standard typewriter keyboard, but would typically be chord key style of operation.

The user of the device may be holding the hand-held embodiment of the device in his hand with his fingers positioned on keys which also have tactile character displays on them.

CONCLUSION, RAMIFICATIONS AND SCOPE OF INVENTION

The invention has wide application for reading in a tactile manner by those who are blind or visually impaired. The invention also has possible application to specialized situations among people who can see.

Hand held devices—This invention is applicable to hand held applications where the user needs to be able to read some amount of information while keeping his eyes on something else, when audio methods are not practical. This could be applied to cell phone instant messaging, allowing students in school to converse with each other with their hands in their pockets at all times. This could also be useful in certain industrial or white collar situations as well. Blind attorneys, for example, have long used Braille notes in their pockets to appear to have memorized amazing amounts of material in the courtroom.

Combined with chord key devices—Chord keys allow typing to take place without a full keyboard by defining chords to symbols. Typically, chord key devices allocate one key per finger, although this is not a hard and fast rule. If each chord key also becomes a tactile display, then rapid typing, can occur together with rapid reading without changing position.

Since the outstanding difference between the blind who are employable and those who are not, appears to be an ability to read and write, (via reading by Braille), this invention will have a positive effect on the ability of the blind and visually impaired to function successfully in society by extending the benefits of tactile reading through Braille to those for whom Braille is impractical. Additionally, it is expected that this invention will be significantly cheaper to manufacture than Braille tactile displays are.

The invention claimed is:

1. A device to tactually display language to a user comprising:

A device surface having a first plane in which is mounted in module mountings a plurality of independently controllable modules, each of said modules further comprising:
a module surface having a second plane;
a rotatable shaft connected to said module surface extending outwards perpendicular to said module surface and rigidly attached to a control system below said module surface for rotating said shaft in a controlled manner wherein said shaft is rotatable through at least 180 degrees;
a tactually perceptible indicium rigidly connected to said shaft above said module surface wherein each said indicium:
exhibits a first degree of rotation; and
points in a first direction depending on said first degree of rotation;
wherein said first direction pointed is representative of a first symbol when two or more of said independently controllable modules are operated together; and
wherein each of said independently controllable modules is independently controllable as to rotation of said modules' indicium, so as to present a plurality of indicia to represent one or more character symbols;
wherein each said module mounting in said device surface is dimensioned so as to allow said second plane to be flush with said first plane; and
when grouped into 2 columns by 3 rows to represent a Braille character, 4 or more of said indicia are identical in shape.

2. The device according to claim 1 wherein said first direction pointed is tactually perceptible by said user.

3. The device according to claim 2 wherein a section of said module surface is recessed below said second plane so as to allow rotation of the top of said indicium of said module below or flush with said second plane and wherein said top of said tactually perceptible indicia are not above said second plane.

4. The device according to claim 2 or 3 wherein said tactually perceptible indicia comprise asymmetric surface features tactually perceptible to said user.

5. The device according to claim 2 or 3 wherein said tactually perceptible indicia incorporate vertical and horizontal curves.

6. The device according to claim 2 or 3 wherein said tactually perceptible indicia are triangular.

7. The device according to claim 2 or 3 wherein said tactually perceptible indicia are linear in shape.

8. The device of claim 2 or 3 further comprising pointing elements surrounded by permanent, stationary raised nubs enhancing said user's tactual perception of said direction pointed.

9. The device according to claim 2 or 3 wherein said indicia exhibits a second degree of rotation and at all times indicates a rotation to some degree.

10. The device according to claim 9 wherein said device incorporates controls operable by said user, wherein said controls signal the device to change said degree of rotation for a plurality of said modules so as to change the character symbols represented by the device.

11. The device according to claim 10 further comprising touch sensitive sensors.

12. The device of claim 2 or 3 further comprising a vibrating component providing vibrations that change in a controlled manner in accordance with changes to said character symbols such that said changes are capable of human tactual perception and interpretation as relevant to the character representations.

13. The device of claim 2 or 3 wherein said indicia are offset from the axis of their rotation.

14. The device of claim 2 or 3 wherein said device is handheld.

15. The device of claim 2 or 3 further comprising a radio.

16. The device of claim 2 or 3 further comprising a cell phone.

17. The device of claim 2 or 3 further comprising a computer.

18. The device of claim 2 or 3 further comprising a PDA.

19. A hand-held instrument for assisting the vision impaired with reading, consisting of:
- a surface;
- a plurality of directional symbols rotatably mounted to said surface present in raised relief above said surface, wherein said directional symbols rotate to a plurality of individual positions and;
- wherein each of said individual positions is representative of a character; and
- wherein said directional symbols are rotatable to a subsequent individual position.

20. The device according to claim 19 wherein said subsequent individual positions are determined by a programmed script.

* * * * *